Figure 1:
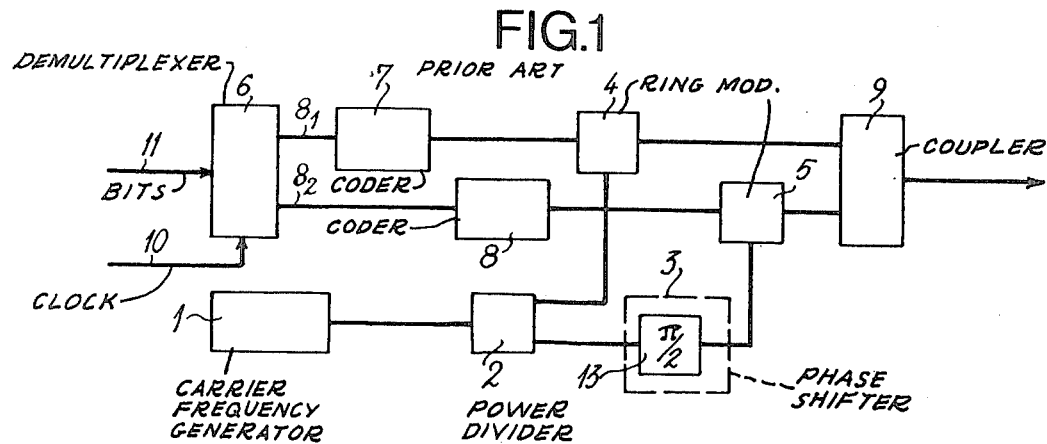

United States Patent [19]

Poitevin et al.

[11] 4,210,879
[45] Jul. 1, 1980

[54] FOUR-PHASE STAGGERED SHIFT KEYING MODULATOR SYSTEM

[76] Inventors: Jean-Pierre R. Poitevin, 53, rue Denis-Gogue, 92140 Clamart; Pierre C. Brossard, 9, rue des Fleurs, 78190 Montigny-le-Bretonneux, both of France

[21] Appl. No.: 912,513

[22] Filed: Jun. 5, 1978

[30] Foreign Application Priority Data

Jun. 13, 1977 [FR] France .................. 77 18770

[51] Int. Cl.² ............................................ H04L 27/20
[52] U.S. Cl. ...................... 332/9 R; 371/49; 332/16 R; 375/67
[58] Field of Search ........... 332/16 R, 16 T, 30 R, 332/30 V, 9 R, 19; 325/30, 161, 163, 45, 145; 331/23

[56] References Cited

U.S. PATENT DOCUMENTS

| | | | |
|---|---|---|---|
| 3,393,380 | 7/1968 | Webb | 332/19 |
| 4,125,817 | 11/1978 | Bagdasarjanz et al. | 332/9 R X |

*Primary Examiner*—Siegfried H. Grimm
*Attorney, Agent, or Firm*—Laff, Whitesel & Rockman

[57] ABSTRACT

A four phase staggered phase shift keying modulator system having means to modulate a voltage controlled oscillator generating the carrier by positive or negative pulses of a predetermined duration to shift the phase of the carrier by +90° or −90°, the positive or negative being produced by individual coding of a series of applied pulses.

6 Claims, 4 Drawing Figures

FOUR-PHASE STAGGERED SHIFT KEYING MODULATOR SYSTEM

This invention relates to a staggered jump four phase staggered shift keying modulator system especially suitable for use with high frequency carriers, such as microwave frequency carriers.

Modulation in four phase states with staggered shifts is well known in the modulation systems called MDP4 (corresponding in Anglo-Saxon literature to 4PSK systems). In addition, in the French Patent Application 77 11008 filed on Apr. 6, 1977 by the first named of the present Applicants and entitled "Systems for transmission of digital information in staggered shift multiple level modulation", systems were described in which a series of bits modulates a carrier in such a way that each bit, depending on its value 1 or 0, modifies or not (or visa versa) the phase condition of the carrier defined by the bits which precede it, from the phase shift representing its contribution, which may or may not be determined according to transition coding.

There are certain disadvantages inherent in this type of modulator when they are to be used with very high carrier frequencies, for example, in the microwave frequency field. The couplers, the modulators and the phase shifters which can operate at these very high frequencies are extremely expensive. On the other hand, these basic circuits cause significant insertion losses which considerably reduce the power of the modulated frequency in relation to the power of the carrier frequency generator.

An object of the present invention consists in providing a four phase modulator with staggered phase shifts which avoids the disadvantages mentioned above and more particularly allows operation at a very high carrier frequency.

According to one feature of the invention, such a modulator with transition coding is provided, which includes a voltage controlled oscillator serving as a carrier frequency generator whose frequency can be modulated by positive or negative pulses of a duration inferior or equal to the duration of one bit so as to be able at each pulse, depending on the sign of the latter, to shift the phase of the carrier emitted by the oscillator by $+90°$ or $-90°$, the said positive or negative pulses being produced by individual coding of the series of pulses applied to the modulator.

Figure 2:
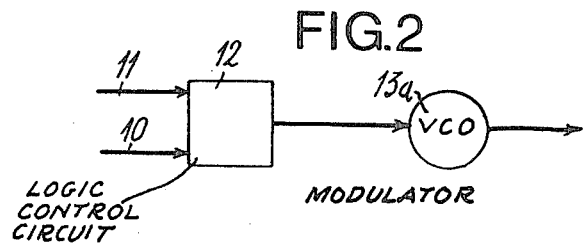
Figure 3:
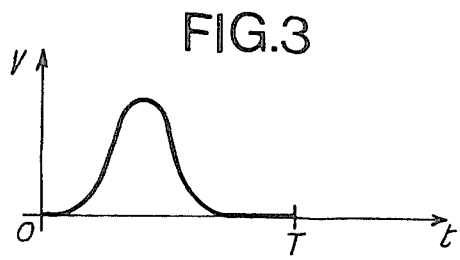
Figure 4:
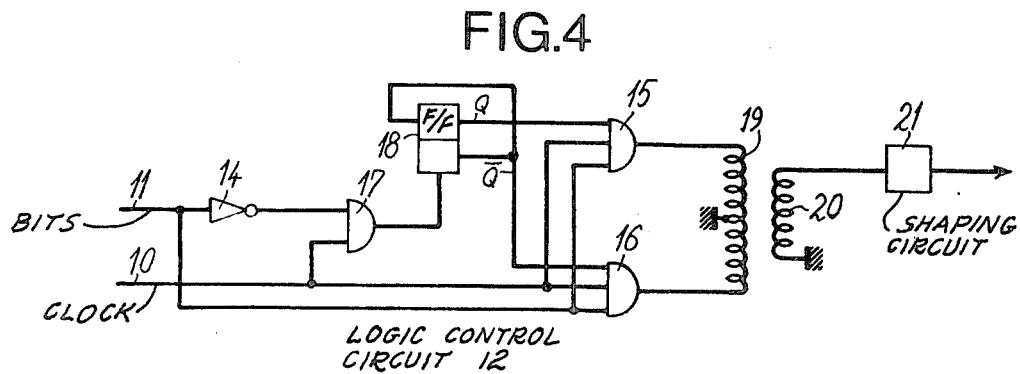

The feature of the invention mentioned above, in addition to others, can be more clearly understood from the following description of embodiments, the said description being made with reference to the attached drawings in which:

FIG. 1 is the block diagram of a staggered shift key four phase modulator with transition coding in accordance with the prior art which has already been described in the introduction, FIG. 2 is the block diagram of a staggered shift key four phase modulator with transition coding in accordance with the invention, FIG. 3 is a voltage-time graph illustrating the form of a pulse used in the modulator of FIG. 2 and, FIG. 4 is a schematic diagram of a control circuit used in the modulator of FIG. 2.

If reference is made to the defination of four phase state staggered shift key modulation with transition coding, such as has been described in the French patent application 77 11008 already mentioned above, it is found that:

the changes of phase condition are carried out at the bit rhythm the 0 bits do not cause any modification in the phase condition, the 1 bits cause a phase change of $+90°$ or $-90°$ in the carrier, two successive phase changes having the same sign if the 1 bits which cause them are separated by an even number of 0 bits or by opposite signs if the number of 0 bits is odd.

With reference to FIG. 5 of the French patent application mentioned above, a four-phase modulator with staggered shifts and transition coding is described. This modulator is shown in FIG. 1 of the present application. It includes a carrier frequency generator 1, a 3 dB power divider or coupler 2, a 90°-phase shifter 3, ring modulators 4 and 5, a demultiplexer 6 with two outputs, two circuits 7 and 8 for transition coding, and a 3 dB mixing or coupling circuit 9. The functioning of this modulator is given in the description of the above-mentioned patent application and a reminder will be given here that the demultiplexer 6 demultiplexes a series of bits applied on line 11 on the command of a clock signal on line 10 at the bit frequency. The odd series is applied to the circuit 7 whose output signal modulates the carrier in the modulator 4. The even series is applied to the circuit 8 whose output signal modulates a 90°-phase shifted carrier in the modulator 5. The coupler 9 adds the two frequencies originating from the modulators 4 and 5 which are modulated in quadrature. Finally, the outputs of the demultiplexer 6 retain their condition between two bits which they emit.

The modulator in FIG. 2 includes a logic control circuit 12 which receives the series of bits applied on line 11 and a clock signal applied on line 10 at the bit frequency. The output of the control circuit 12 is connected to the control input of the voltage controlled oscillator 13a which generates the output signal at the carrier frequency.

The circuit 12 emits a 0 signal when a 0 bit is present at its input. There is then no change in the output signal of oscillator 13a.

The circuit 12 incorporates apparatus for the determination of the parity of the number of 0 bits which immediately precede a 1 bit applied to its input and on the reception of a 1, if the said number is even, the circuit 12 delivers a positive pulse V(t), and if the number is odd, it emits a negative pulse V(t). The emitted pulse, whatever its size, has a duration which is, at the most equal to that of the bit. The form of the function of V(t), of which an example is shown in FIG. 3, is such that it verifies the following relationship:

$$\int_O^T S \times V(t)dt = \frac{1}{4}$$

where S is the modulation sensitivity of the oscillator expressed by the frequency/voltage ratio and T is the duration of one bit. In practice, the control voltage applied to the oscillator acts on the frequency of its output signal. When the above relationship is verified, after each pulse, the phase of the signal emitted by voltage controlled oscillator 13a varies by 90°, either positively or negatively depending on the pulse sign.

It should be noted that the form of the pulse V(t) may be selected while conforming with the above relationship, in such a way as to render the phase transition more or less abrupt, which allows the waveform of the phase modulated carrier emitted by the oscillator 13a to be shaped.

It is clear that the signal emitted by voltage controlled oscillator 13 conforms well to the above definition, that is the modulation generated is a stepped shift modulation with four phase states and employing transition coding.

FIG. 4 shows a practical example of the logic control circuit 12 of FIG. 2. The signal input on line 11 is applied on the one hand, to the input of a logic inverter 14 and, on the other hand, in parallel to the first inputs of the two AND gates 15 and 16, which each have three inputs. The output of the inverter 14 is connected to the first input of an AND gate 17 with two inputs, whose second input is connected to the input wire of the clock 10 and whose output is connected to the control input of a flip-flop 18 which changes condition with each signal applied to its control input. The flip-flop 18 incorporates an output Q connected to the third input of the gate 15 and an output Q̄ connected on the one hand, to the third output of gate 16, and on the other hand, to the signal input of the flip-flop 18. The clock input wire 10 is in turn linked in parallel, to the second inputs of the gates 15 and 16. The outputs of the gates 15 and 16 are respectively connected to the terminals of the primary winding 19 of the transformer which has a centre tap which is grounded or earthed. The secondary 20 of the transformer has one terminal connected to ground or earth and its other terminal connected to the input of a shaping circuit 21, whose output is connected to the voltage control input of the oscillator 13a.

The shaping circuit 21 may be a filter coupled to an amplifier or an attenuator which may serve to give to the pulse from the secondary 20 the most appropriate form, as is discussed above, with reference to FIG. 3.

In practice, the flip-flop 18 behaves as a divide-by-two circuit for dividing the signals applied to its control input. This may be the well-known "D-flip-flop" which is defined in the ITT "Reference Data for Radio Engineers"; published by Howard W. Sams & Co. of Indianapolis, Ind. At each 1 of the series of bits, one or other of the gates 15 or 16 will emit a 1, which determines the direction of the current in the primary 19, and, hence, in the secondary 20. The table below indicates, by way of example, the conditions of the components and the phase shifts resulting from the application of a series of bits to the input 11 of the control circuit of FIG. 4.

Table

| | | | | | | | | | | | | |
|---|---|---|---|---|---|---|---|---|---|---|---|---|
| Series applied to 11 | 1 | 0 | 1 | 0 | 0 | 1 | 0 | 0 | 1 | 0 | 1 | 0 |
| Output from 17 | 0 | 1 | 0 | 1 | 1 | 0 | 1 | 1 | 0 | 1 | 0 | 1 |
| Output 18 Q | 0 | 1 | 1 | 0 | 1 | 1 | 0 | 1 | 1 | 0 | 0 | 1 |
| Output 18 Q̄ | 1 | 0 | 0 | 1 | 0 | 0 | 1 | 0 | 0 | 1 | 1 | 0 |
| Output from 15 | 0 | 0 | 1 | 0 | 0 | 1 | 0 | 0 | 1 | 0 | 0 | 0 |
| Output from 16 | 1 | 0 | 0 | 0 | 0 | 0 | 0 | 0 | 0 | 0 | 1 | 0 |
| Phase shift in 13 | +90° | 0 | −90° | 0 | 0 | −90° | 0 | 0 | −90° | 0 | +90° | 0 |
| Phase of the carrier | +90° | +90° | 0 | 0 | 0 | −90° | −90° | −90° | −180° | −180° | −90° | −90° |

It is obvious that in the arrangement of FIG. 2, the only apparatus operating at the carrier frequency is the oscillator 13a, which eliminates the difficulties of adjustment, the insertion losses and the cost of the supplementary apparatus used at elevated frequencies in the arrangements of the prior art.

What is claimed is:

1. A four phase staggered shift keying modulator employing transition coding by a series of binary digits in which each bit does or does not modify the phase condition of a carrier according to transition coding by a phase shift representing its contribution depending on its value defined by the two bits which precede it, including a voltage controlled oscillator means for generating the carrier, a control circuit, means to apply the series of bits to the input of the control circuit, the control circuit generating positive or negative pulses of a duration less than or equal to the duration of one bit of the series, means to apply the positive or negative pulses from the control circuit to the input of the voltage controlled oscillator, each pulse shifting the phase of the output frequency of the oscillator by +90° or −90° depending on its sign, wherein the 0 bits do not generate any pulses and the 1 bits generate a positive or a negative pulse, the sign of two successive pulses being modified or not depending on the parity of the number of intermediate 0 bits.

2. A modulator as claimed in claim 1 including a logic inverter, means to connect the said series of bits to the input of the logic inverter, a flip-flop, the output of the logic inverter being connected to the complementary signal input of the flip-flop, a pair of AND gates, each gate having three inputs, each output of the flip-flop being connected to an input of a respective AND gate, means to connect said series of bits to a second input of each AND gate, means to connect a clock signal at the bit rhythm to a third input of each AND gate, and a transformer, the outputs of the AND gates being connected to the centre tapped primary winding of the transformer, the secondary winding of the transformer having one terminal earthed and the other terminal connected to the control input of the oscillator.

3. A modulator as claimed in claim 2 wherein the flip-flop is a delay flip-flop circuit having an output which is a delayed response to a pulse which occurs earlier in a binary pulse stream.

4. A modulator as claimed in claim 2 or claim 3 including an pulse shaping circuit connected between the output of the secondary winding and the control input of the oscillator.

5. A four-phase staggered shift keying modulator comprising means for receiving an input signal comprising a series of intermixed 1 and 0 bit signals and a series of clock signals, an output voltage controlled oscillator means, control circuit means responsive to said input and clock signals, means in said control circuit means for determining the parity of the number of 0 bits in said series of bit signals which immediately precede a 1 bit, means in said control circuit responsive to an even parity for delivering a positive pulse V(t) and responsive to an odd parity for delivering a negative pulse V(t), wherein V(t) is equal to $$\int_{O}^{T} S \times V(t) dt = \tfrac{1}{4}$$

where: S is the modulation sensitivity of said oscillator means expressed by a frequency/voltage ratio, and T is the duration of one bit.

6. The modulator of claim 5 wherein the phase of a signal emitted by the voltage-controlled oscillator means varies by 90°, and means responsive to said positive or negative pulse to select the direction of the phase change of said emitted signal.

* * * * *